(12) United States Patent
Paczkowski et al.

(10) Patent No.: US 8,340,257 B1
(45) Date of Patent: Dec. 25, 2012

(54) SWITCHING MODES IN AN INTERACTIVE VOICE RESPONSE SYSTEM

(75) Inventors: Lyle Walter Paczkowski, Mission Hills, KS (US); Kimberly J. Ganote, Lee's Summit, MO (US); Stevan A. Klesper, Gardner, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1381 days.

(21) Appl. No.: 11/972,926

(22) Filed: Jan. 11, 2008

(51) Int. Cl.
*H04M 11/00* (2006.01)
*H04M 1/64* (2006.01)

(52) U.S. Cl. ............... 379/93.17; 379/76; 379/88.12; 379/88.13; 379/88.18; 379/93.09

(58) Field of Classification Search ............ 379/88.01, 379/88.11, 88.12, 88.13, 88.18, 93.01, 93.05, 379/93.09, 93.17, 102.01, 102.02, 76, 77, 379/80, 88.14, 88.25, 100.16
See application file for complete search history.

(56) References Cited

U.S. PATENT DOCUMENTS

| | | | | |
|---|---|---|---|---|
| 5,802,526 A | * | 9/1998 | Fawcett et al. | 707/104 |
| 6,061,433 A | * | 5/2000 | Polcyn et al. | 379/93.12 |
| 6,091,805 A | | 7/2000 | Watson | |
| 6,259,786 B1 | | 7/2001 | Gisby | |
| 6,493,428 B1 | * | 12/2002 | Hillier | 379/67.1 |
| 7,236,574 B2 | | 6/2007 | Haldeman et al. | |
| 7,515,695 B1 | * | 4/2009 | Chan et al. | 379/88.18 |
| 7,649,877 B2 | | 1/2010 | Vieri et al. | |
| 2002/0069069 A1 | | 6/2002 | Kanevsky et al. | |
| 2003/0074198 A1 | * | 4/2003 | Sussman | 704/270.1 |
| 2003/0206551 A1 | * | 11/2003 | Naim et al. | 370/401 |
| 2004/0012643 A1 | | 1/2004 | August et al. | |
| 2007/0135101 A1 | * | 6/2007 | Ramati et al. | 455/414.1 |
| 2008/0152094 A1 | * | 6/2008 | Perlmutter | 379/88.01 |
| 2008/0304639 A1 | * | 12/2008 | McDonough et al. | 379/93.01 |

OTHER PUBLICATIONS

USPTO Office Action Summary mailed Nov. 29, 2010 from U.S. Appl. No. 12/013,053.

* cited by examiner

*Primary Examiner* — Binh Tieu (57) ABSTRACT

A method for switching interactive modes in a menu system is disclosed. An audio interactive voice response session is established to provide audio menus to a communication device. A data session with said communication device is also established. The data session is used to instruct the communication device to display indicia that a second mode may be activated. The indicia may be an icon indicative of the second mode. A user selection of the indicia on the communication device sends a message to the IVR system indicating that the second mode is to be activated. The second mode may be a text mode wherein text menus are presented to the user instead of audio menus. The second mode may be a suspend mode whereby the IVR session is halted at its present menu choices and saved for later reactivation.

27 Claims, 5 Drawing Sheets

FIGURE 1

```
┌─────────────────────────────────────────┐
│ ESTABLISH AN AUDIO IVR SESSION TO PROVIDE│
│ AUDIO MENUS TO A COMMUNICATION DEVICE   │
│                  202                     │
└─────────────────────────────────────────┘
                    │
┌─────────────────────────────────────────┐
│    ESTABLISH A DATA SESSION WITH THE    │
│          COMMUNICATION DEVICE           │
│                  204                     │
└─────────────────────────────────────────┘
                    │
┌─────────────────────────────────────────┐
│   INSTRUCT THE COMMUNICATION DEVICE     │
│  TO DISPLAY AN INDICIA THAT A SECOND    │
│         MODE MAY BE ACTIVATED           │
│                  206                     │
└─────────────────────────────────────────┘
                    │
┌─────────────────────────────────────────┐
│     RECEIVE MESSAGE TO ACTIVATE         │
│             SECOND MODE                  │
│                  208                     │
└─────────────────────────────────────────┘
                    │
┌─────────────────────────────────────────┐
│         ACTIVATE SECOND MODE            │
│                  210                     │
└─────────────────────────────────────────┘
```

SWITCHING MODES IN AN INTERACTIVE VOICE RESPONSE SYSTEM

TECHNICAL BACKGROUND

Interactive Voice Response systems (IVR) help computers recognize touch tone (DTMF) and voice responses. This ability to recognize these audio responses allow a computer to present pre-recorded or dynamically generated audio menus to a caller. For example, an audio menu may speak: "Please choose or say one to speak to Mr. Smith. Please choose or say two to speak to Mr. Jones." The caller then chooses from the options given by these audio menus. The caller may choose options using the pushbuttons of the calling communication device, or by speaking. These audio menu IVR systems are in wide use for applications such as telephone banking, televoting, and credit card transactions.

OVERVIEW

A method for switching interactive modes in a menu system is disclosed. An audio interactive voice response session is established to provide audio menus to a communication device. A data session with said communication device is also established. The data session is used to instruct the communication device to display indicia that a second mode may be activated. The indicia may be an icon indicative of the second mode. A user selection of the indicia on the communication device sends a message to the IVR system indicating that the second mode is to be activated. The second mode may be a text mode wherein text menus are presented to the user instead of audio menus. The second mode may be a suspend mode whereby the IVR session is halted at its present menu choices and saved for later reactivation.

A communication system that switches interactive modes in a menu system is disclosed. The communication system includes an audio interface adapted to establish an audio IVR session with an IVR system. The IVR system provides audio menus to said communication system. The communication system also includes a data interface adapted to establish a data session with the IVR system. The communication system displays indicia that a second mode may be activated. Responsive to a user selection of the indicia, the communication system sends a message to the IVR system. The IVR system responds with at least a message that the communication device should display or interact in a second mode.

DETAILED DESCRIPTION

Figure 1:
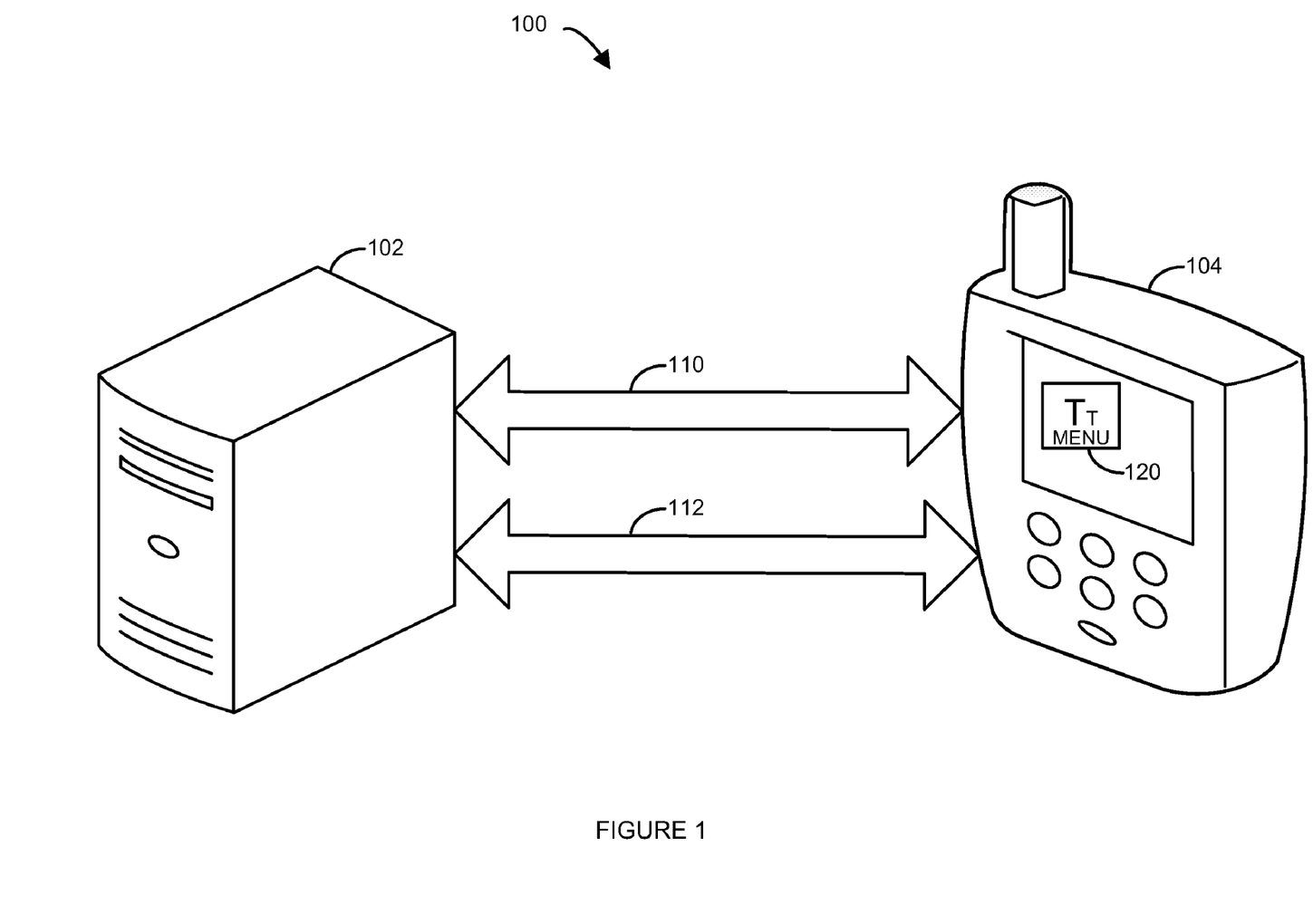
FIG. 1 is a block diagram illustrating a menu system that switches interactive modes.

FIG. 1 is a block diagram illustrating a menu system that switches interactive modes. In FIG. 1, menu system 100 comprises IVR server 102, communication device 104, audio IVR session 110, data session 112, and indicia 120. IVR server 102 is operatively coupled to communication device 104 by audio IVR session 110. IVR server 102 is operatively coupled to communication device 104 by data session 112.

Communication device 104 may be any device, system, combination of devices, or other such communication platform capable of communicating audio and data with IVR server 102. Communication device 104 may be, for example, an expanded function telephone, a mobile phone, a wireless phone, a wireless modem, a personal digital assistant (PDA), a computer system with a sound input, output, and an internet connection, a computer with Public Switched Telephone Network (PSTN) connection and a modem, a computer with a network card, a Voice over Internet Protocol (VoIP) phone, a Voice Over Packet (VOP) phone, or a soft phone, as well as other types of devices or systems that have a display and can exchange audio and data with IVR server 102.

Audio IVR session 110 may be established between IVR server 102 and communication device 104 by any means known in the art for establishing two-way audio communication. For example, audio IVR session 110 may be established via a conventional PSTN. Audio IVR session 110 may be carried via a packet based network such as the internet. The network carrying audio IVR session 110 may be any network or collection of networks that couple, link, or otherwise operatively communicate audio communications between communication device 104 and IVR server 102.

For example, the audio communication between IVR server 102 and communication device 104 may be carried via data packets using Voice over Internet Protocol or some other voice over packet protocol. The network carrying audio IVR session 110 may include secondary networks. For example, the network carrying audio IVR session 110 may include a backhaul network, a local network, a long distance network, a packet network, a PSTN, the internet, or any combination thereof, as well as other types of networks.

Data session 112 may be established between IVR server 102 and communication device 104 by any means known in the art for establishing two-way data communication. For example, data session 112 may be established using analog modems that communicate via a conventional Public Switched Telephone Network (PSTN). Data session 112 may be carried via a packet based network such as the internet. The network carrying data session 112 could be any network or collection of networks that couple, link, or otherwise operatively communicate data between communication device 104 and IVR server 102.

For example, the data session 112 between IVR server 102 and communication device 104 may be carried via data packets using Internet Protocol (IP) or some other packet data protocol. The network carrying data session 112 may include secondary networks. For example, the network carrying data session 112 may include a backhaul network, a local network, a long distance network, a packet network, a PSTN, the internet, or any combination thereof, as well as other types of networks. The network carrying data session 112 may be the same or include the network that carries audio IVR session 110.

In an embodiment, IVR server 102 develops and maintains an association between audio IVR session 110 and data session 112 that allow IVR server 102 to initiate or reestablish audio session 110, data session 112, or both. In an example, if communication device 104 is a VOP phone, then the IP address of communication device 104 may be used to associate audio IVR session 110 and data session 112. A code may be used to separate audio IVR session 110 packets from data session 112 packets. Audio session 110, data session 112, or both, may be initiated or reestablished using either the phone number or IP address of communication device 104.

In another example, if audio IVR session 110 and data session 112 are separate, then a network carrying audio IVR session 110 or data session 112 may maintain a database of user identifications, such as a phone number, that don't change. These user identifications may be associated with the current user IP addresses that periodically change. IVR server 102 may then associate audio IVR session 110 with data session 112 by receiving the caller number or other identification about audio IVR session 110, and querying the database to retrieve the current IP address of communication device 104. This allows IVR server 102 to initiate or reestablish data session 112 with communication device 104 by using the IP address assigned to communication device 104. Audio IVR session 110 may be reestablished using the received caller number or other identification. An example of when audio IVR session 110 and data session 112 are separate would be a situation where audio session 110 is a wireless voice call or session and data session 112 uses a wireless IP link.

In another embodiment, IVR server 102 may send one or more text messages to communication device 104 using the phone number or other identification it received about audio IVR session 110. Likewise, communication device 104 may send text messages to IVR server 102 using the number it called to establish audio IVR session 110. These text messages may contain embedded data that performs the function of data session 112.

When audio IVR session 110 is established, IVR server 102 starts sending at least one audio menu to communication device 104. The spoken word audio menus communicated to communication device 104 via audio IVR session 110 may be prerecorded audio clips that detail menu options, or may be dynamically generated using text to speech technology.

The user may indicate their menu selections or other information by speaking, by pressing buttons, or some other input device such as a touch screen display. Pressing a button or a touch screen display typically causes communication device 104 to send an audio DTMF signal to IVR server 102 via audio IVR session 110. Likewise, the audio of a user's spoken response is sent to IVR server 102 via audio IVR session 110. An example of other information that may be conveyed via audio IVR session 110 is numeric information such as an account number or a telephone number.

When data session 112 is established, IVR server 102 and communication device 104 may send messages to each other via data session 112. IVR server 102 may send messages to communication device 104 that cause communication device 104 to display indicia 120 that a second mode may be activated. The indicia 120 that communication device 104 displays may take the form of an icon.

The user may then indicate that the second mode is to be activated. The user may make this indication by selecting the indicia. For example, the user may select an icon by manipulating a pointer over the icon and then pressing an appropriate button.

When the user has indicated that the second mode is to be activated, communication device 104 sends a message indicating this to IVR server 102 via data session 112. IVR server 102 may send messages to change the interactive mode of audio IVR session 110, data session 112, communication device 104, or a combination thereof. As a result of IVR server 102 sending messages to change the interactive mode of audio IVR session 110, the interactive mode of menu system 100 is changed.

For example, IVR server 102 may send messages that change the interactive mode of menu system 100 from audio menus to text menus. The text menus may be displayed by communication device 104. IVR server 102 may send messages to communication device 104 that allow it to display a text menu. The user may then indicate responses to the text menu instead of the audio menu. These responses may be communicated to IVR server 102 using the audio IVR session 110. In another example, the responses to the text version of an audio menu may be communicated to IVR server 102 using data session 112. In addition, IVR server 102 may also send messages that instruct communication device 104 to change at least one indicia 120 to indicate that another mode, such as audio menus, may be reactivated.

In another example, IVR server 102 may send messages that change the interactive mode of menu system 100 from text menus to audio menus. In addition, IVR server 102 may also send messages that instruct communication device 104 to change at least one indicia 120 to indicate that another mode, such as text menus, may be reactivated.

In another example, IVR server 102 may send messages that change the interactive mode of menu system 100 from an active mode to a suspended mode. IVR server 102 may send messages to communication device 104 that instruct it to record information about audio IVR session 110. The recorded information allows audio IVR session 110 and data session 112 to be disconnected and later restored to the same state or mode without further input from the user. Communication system 104 may then display indicia 120 that a suspended audio IVR session may be restored.

In another example, IVR server 102 may send messages that change the suspended mode of menu system 100 from a suspended mode to an active mode. To restore a suspended audio IVR session, communication device 104 may establish an audio IVR session 110 and data session 112. Communication system 104 may then communicate recorded information about the suspended audio IVR session via data session 112 so that IVR server 102 may restore IVR system to the same state or mode without further input from the user.

In another example, IVR server 102 may send messages that change the interactive mode of menu system 100 from a first active menu to a second active menu within the same audio IVR session. In another example, IVR server 102 may send messages that change the interactive mode of menu system 100 from a currently active audio IVR session to a second audio IVR session. An example of a second audio IVR session is an audio IVR session with a different IVR server. Another example of a second audio IVR session is an audio IVR session that is typically reached by establishing a different audio IVR session such as by dialing a different phone number.

Figure 2:
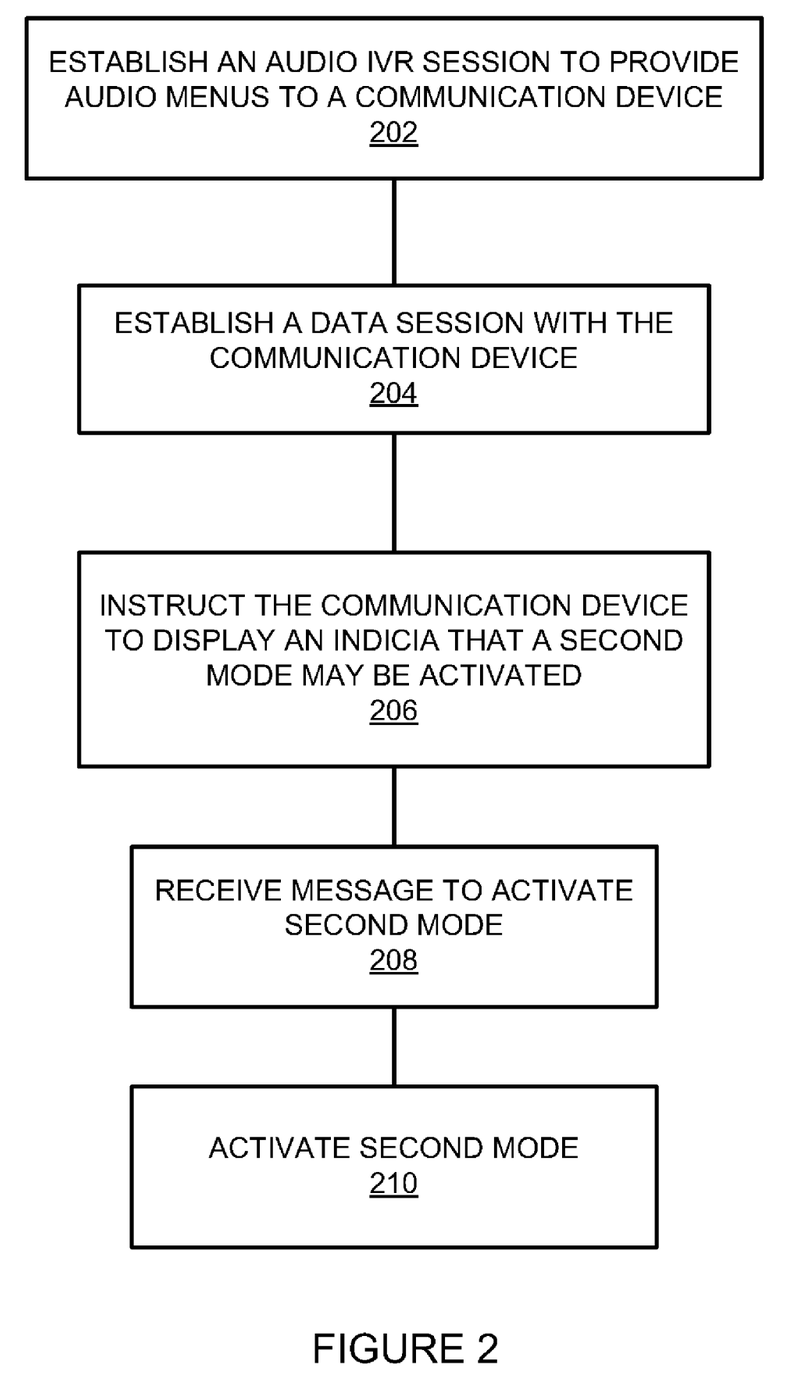
FIG. 2 is a flowchart illustrating a method of operating a menu system that switches interactive modes.

FIG. 2 is a flowchart illustrating a method of operating a menu system that switches interactive modes. The method shown in FIG. 2 may be performed by one or more elements of menu system 100. An audio IVR session is established to provide audio menus to a communication device (202). For example, the audio IVR session may be established between IVR server 102 and communication device 104.

A data session is established with the communication device (204). For example, a data session may be established between IVR server 102 and communication device 104. The data session may be used to send and receive messages to and from the communication device.

The communication device is instructed, via the data session, to display indicia that a second mode may be activated (206). For example, IVR server 102 may send messages to communication device 104 that cause communication device 104 to display indicia that a second mode may be activated. The indicia that communication device 104 displays may take the form of an icon.

A message is received that indicates a second mode is to be activated (208). For example, communication device 104 may send a message to IVR server 102 indicating that the second mode is to be activated. This message may be the result of the user indicating that the second mode is to be activated. The user may have made this indication by selecting the indicia. For example, the user may have selected the icon that the communication device 104 was instructed to display in step 206. The user may have selected this icon by manipulating a pointer over the icon and then pressing an appropriate button on the communication device.

In another example, the message received that indicates a second mode is to be activated is a message from the user. This message may take the form of the user indicating that the second mode is to be activated. The user may have made this indication by selecting the indicia.

The second mode is activated (210). For example, the mode of menu system 100 may change from audio menus to text menus. In another example, the mode of menu system 100 may change from text menus to audio menus. In another example, the mode of menu system 100 may change from an active mode to a suspended mode. In another example, the mode of menu system 100 may change from a suspended mode to an active mode. In another example, the mode of menu system 100 may change from a first active menu to a second active menu within the same audio IVR session. In another example, the mode of menu system 100 may change from a currently active audio IVR session to a second audio IVR session. In another example, the mode of menu system 100 may change to a previously active menu. In another example, the mode of menu system 100 may change by refreshing or repeating a currently active menu. In another example, the mode of menu system 100 may change by restarting the recitation of an audio menu. In another example, the mode of menu system 100 may change by speeding up or slowing down the recitation of an audio menu.

Figure 3:
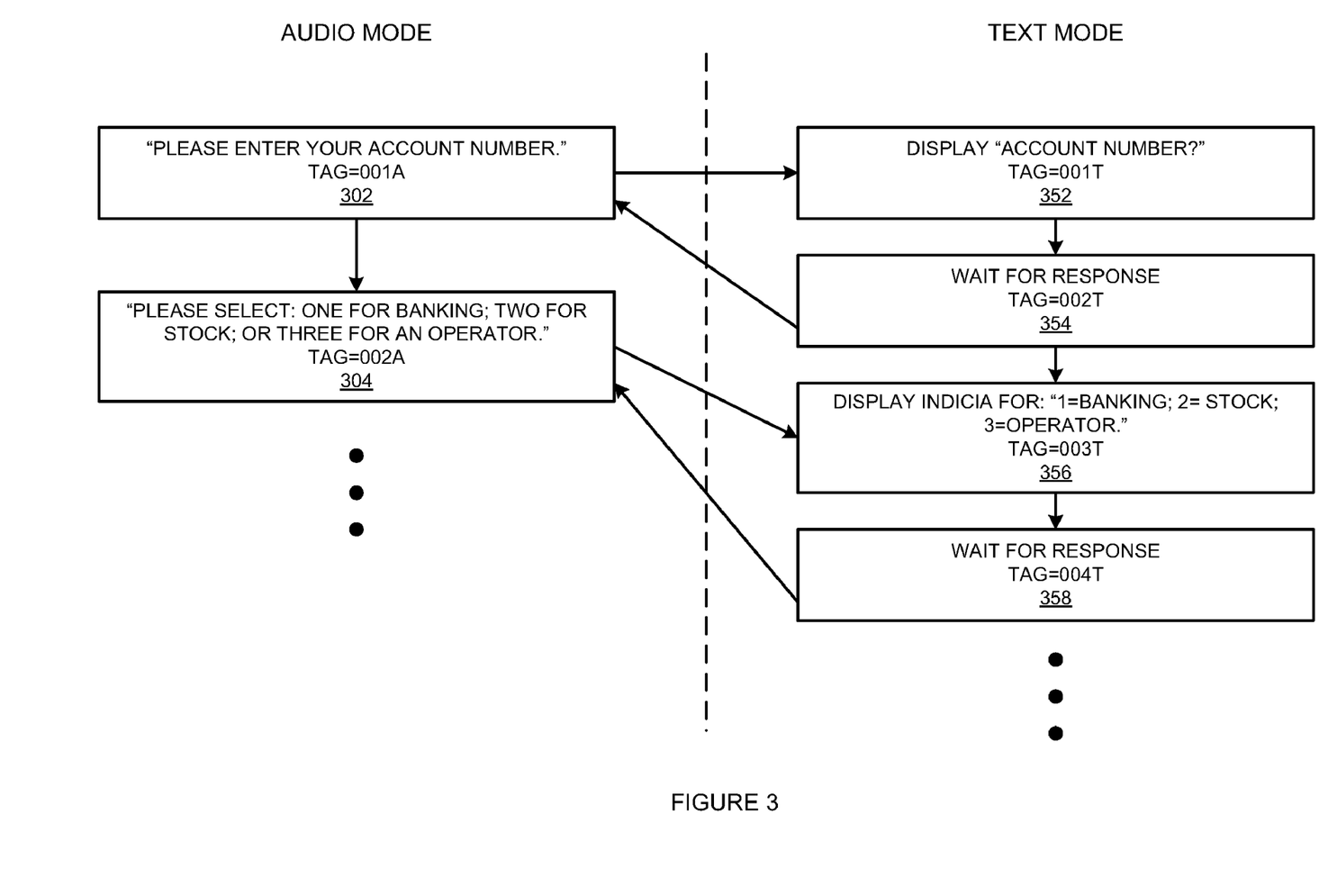
FIG. 3 is a state diagram illustrating a correspondence between audio mode menus and text mode menus.

FIG. 3 is a state diagram illustrating a correspondence between audio mode menus and text mode menus. As described above, a second mode that may be activated is a switch between audio and text menus. Because the menu structure between text and audio menus may be different, a correspondence between the audio menus and the text menu should be maintained. To illustrate this, an example of this correspondence is shown in FIG. 3.

In FIG. 3, example audio mode menus 302 and 304 are shown. Also in FIG. 3, text mode menus 352 and 356 are shown. Text mode also has wait for response states 354 and 358. Audio mode menus 302 and 304 have tag values of 001A and 002A, respectively. Text mode menus 352 and 356 have tag values of 001T and 003T, respectively. Text mode wait for response states have tag values of 002T and 004T, respectively.

The audio mode menus start with audio mode menu 302 which presents the audio "Please enter your account number." Audio mode menu 302 may repeat this audio until the user responds. Once the user has responded to audio mode menu 302, the user is presented with audio mode menu 304. Audio mode menu 304 presents the audio "Please select: one for banking; two for stock; or three for an operator." Audio mode menu 304 may repeat this audio until the user responds. This process may continue for additional audio mode menus.

While audio mode menu 302 is being presented to the user, the menu system may transition to text mode menus. Audio mode menu 302 would transition to text mode menu 352. Text mode menu 352 displays "Account number?" Text mode would then transition to wait for response state 354 while text mode menu 352 is displayed.

Once the user has responded, text mode would transition to text mode menu 356. Text mode menu 356 displays indicia for: "1=Banking; 2=Stock; 3=Operator." Text mode would then transition to wait for response state 358. This process may continue for additional text mode menus.

While audio mode menu 304 is being presented to the user, the menu system may transition to text mode menus. Audio mode menu 304 would transition to text mode menu 356. Text mode would then transition to wait for response state 354 while text mode menu 356 is displayed.

While text mode is in wait for response state 354, the menu system may transition to audio mode menus. Text mode wait for response state 354 would transition to audio mode menu 302. Similarly, while text mode is in wait for response state 358, the menu system may transition to audio mode menus. Text mode wait for response state 358 would transition to audio mode menu 304.

To facilitate these transitions, tags are assigned to each menu or state in both text and audio mode. A mapping of tags between the menus allows the transitions to take place in an orderly manner without skipping a menu or confusing the user. To illustrate, consider the audio mode to text mode transitions shown in FIG. 3. These transitions may be represented by mappings that associate tag=001A to tag=001T and tag=002A to tag=002A. The text mode to audio mode transitions shown in FIG. 3 may be represented by the mappings that associate tag=002T to tag=001A and tag=004T to tag=002A. Any unassociated tags may not have a corresponding menu or state in the audio or text mode. Accordingly, the system may not allow the transition until a menu or state is reached that has a tag with an association. This is illustrated in FIG. 3 by the text mode menus 352 and 356 whose tags, 001T and 003T, respectively, are not associated with an audio mode tag. Accordingly, the system would wait until the text mode menus 352 or 354 were displayed and it was waiting for a response (i.e., states 354 and 358, respectively) before it would allow a transition into audio mode.

Figure 4:
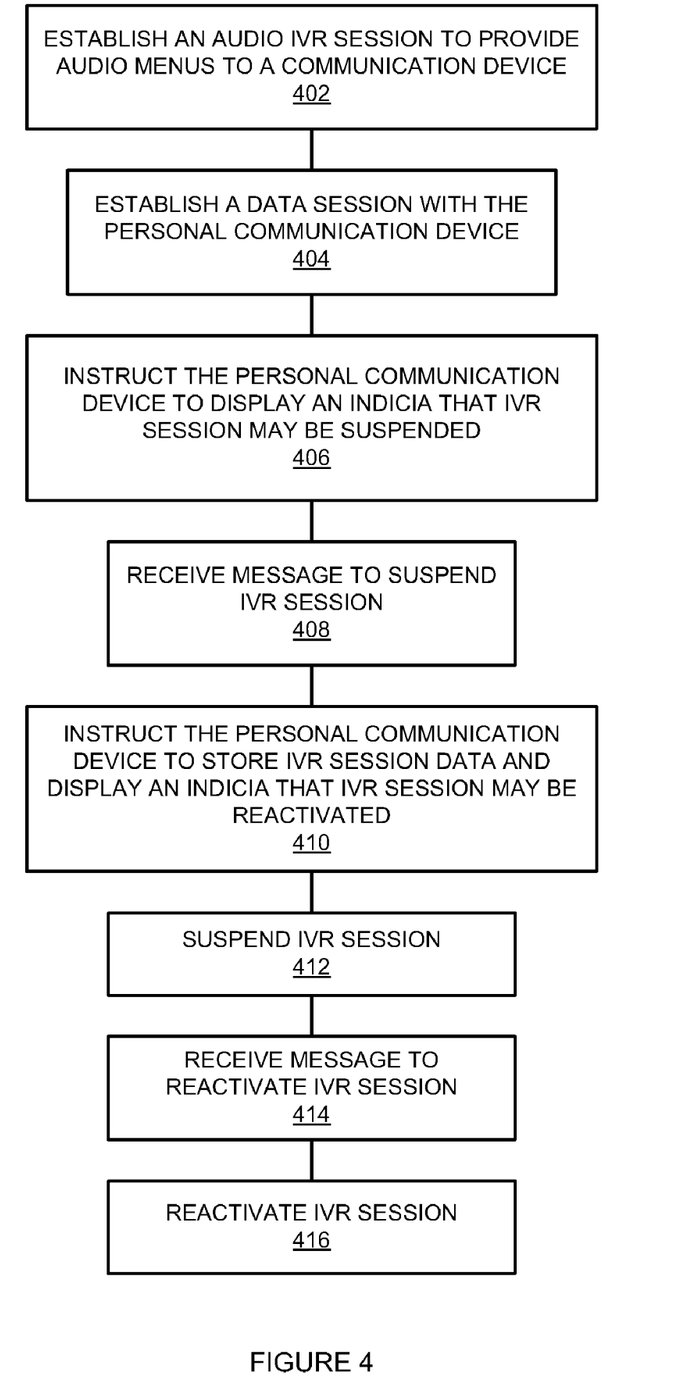
FIG. 4 is a flowchart illustrating a method of operating a menu system to switch interactive modes to suspend and reactivate an IVR session.

FIG. 4 is a flowchart illustrating a method of operating a menu system to switch interactive modes to suspend and reactivate an audio IVR session. An audio IVR session is established to provide audio menus to a communication device (402). For example, the audio IVR session may be established between IVR server 102 and communication device 104.

A data session is established with the communication device (404). For example, a data session may be established between IVR server 102 and communication device 104. The data session may be used to send and receive messages to and from the communication device.

The communication device is instructed, via the data session, to display indicia that the audio IVR session may be suspended (406). For example, IVR server 102 may send messages to communication device 104 that cause communication device 104 to display indicia that the audio IVR session may be suspended. The indicia that communication device 104 displays may take the form of an icon. Example icons may be similar to a stop sign or the symbol on the pause button of a DVD player.

A message is received that indicates the audio IVR session is to be suspended (408). For example, communication device 104 may send a message to IVR server 102 indicating that the audio IVR session is to be suspended. This message may be the result of the user indicating that the audio IVR session is to be suspended. The user may have made this indication by selecting the indicia. For example, the user may have selected the icon that the communication device 104 was instructed to display in step 406. The user may have selected this icon by manipulating a pointer over the icon and then pressing an appropriate button on the communication device.

In another example, the message received that indicates the audio IVR session is to be suspended is a message from the user. This message may take the form of the user indicating that the audio IVR session is to be suspended. The user may have made this indication by selecting the indicia.

The communication device is instructed to store data associated with the audio IVR session and also display an indicia that the audio IVR session may be reactivated (410). The data associated with the audio IVR session that the personal communication device stores may include, but is not limited to: the phone number dialed to initiate the audio IVR session; a tag associated with the currently active menu; a unique identifier of the audio IVR session; and, some or all of the already selected menu choices or data entries.

After enough data associated with the audio session to restore the audio IVR session to the same point without further user intervention is stored, the audio IVR session is suspended (412). To suspend the audio IVR session, the data session, the audio IVR session, or both, may be disconnected.

A message is received that indicates the audio IVR session is to be reactivated (414). This message may take the form of the user indicating that the audio IVR session is to be reactivated. For example, the user may have made this indication by selecting the indicia. In another example, the user may have made this indication by dialing the same phone number dialed to originally initiate the now suspended audio IVR session.

The audio IVR session is reactivated (416). For example, the audio IVR session may be reactivated by redialing the phone number dialed to initiate the suspended audio IVR session. A data session may also be reestablished. The data session may be used to communicate the data associated with the suspended audio IVR session to allow the audio IVR session to be restored to the point where it was suspended without further user intervention. In another example, the data associated with the suspended audio IVR session is used to replay the user's menu choices and data entries. By replaying the user's menu choices and data entries, the audio IVR session may be restored to the point at which it was suspended without user intervention. In addition, the user's menu choices and data entries may be replayed without waiting for the recitation of the audio menus to complete.

Figure 5:
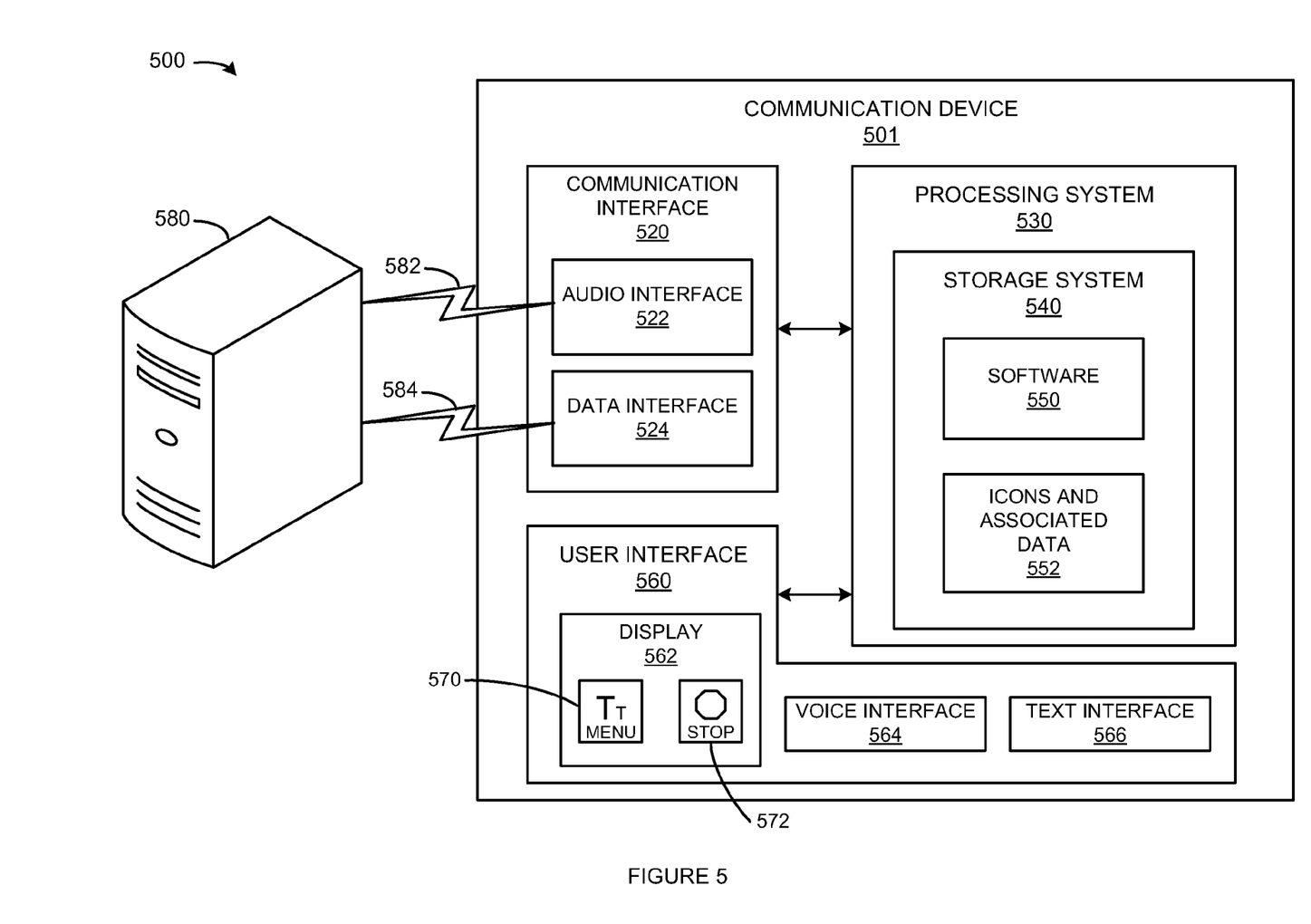
FIG. 5 is a block diagram illustrating a menu system that switches interactive modes.

FIG. 5 is a block diagram illustrating a menu system that switches interactive modes. Menu system 500 may operate as described above. Menu system 500 comprises communication device 501, IVR server 580, audio communication link 582, and data communication link 584.

Communication device 501 includes communication interface 520, processing system 530, and user interface 560. Communication interface 520 includes audio interface 522 and data interface 524. Audio interface 522 is operatively coupled to IVR server 580 via audio communication link 582. Data interface 524 is operatively coupled to IVR server 580 via data communication link 584.

Processing system 530 includes storage system 540. Storage system 540 stores software 550. Storage system 540 also stores icons and associated data 552. Storage system 540 may also store other indicia and associated data. Processing system 530 is linked to communication interface 520 and user interface 560.

Communication device 501 could be comprised of a programmed general-purpose computer, although those skilled in the art will appreciate that programmable or special purpose circuitry and equipment may be used. Communication device 501 may be distributed among multiple devices that together comprise elements 520-572.

Communication interface 520, audio interface 522, and data interface 524, may comprise one or more of: a network interface; wireless network interface; modem; wireless modem; port; telephone jack; telephone plug; transceiver; or, some other wired or wireless communication device. Communication interface 520, audio interface 522, and data interface 524, may be distributed among multiple communication devices.

Processing system 530 may comprise a computer microprocessor, logic circuit, or some other processing device. Processing system 530 may be distributed among multiple processing devices.

User interface 560 includes display 562, voice interface 564, and text interface 566. Text interface 566 may comprise a keyboard, keypad, mouse, stylus, touch screen, or some other type of user device used for text input. Voice interface may comprise a microphone and speaker. Display 562 displays indicia 570 and 572. User interface 560 and its elements may be distributed among multiple user devices.

Storage system 540 may comprise a disk, tape, integrated circuit, server, or some other memory device. Storage system 540 may be distributed among multiple memory devices.

Processing system 530 retrieves and executes software 550 from storage system 540. Processing system 530 also retrieves icons and associated data 552. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for switching interactive modes, comprising:
   establishing an audio interactive voice response session to provide audio menus to a communication device, wherein each of the audio menus have at least one tag identifier associated therewith;
   establishing a data session with said communication device;
   sending a message via said data session to said communication device that instructs said communication device to display an indicia that a second mode may be activated;
   receiving a message from said communication device that is responsive to a user selection that indicates that said second mode is to be activated;
   activating said second mode to provide text menus corresponding to the audio menus, wherein ones of the text menus are associated with ones of the audio menus using the tag identifiers.

2. The method of claim 1, wherein said second mode suspends said audio interactive voice response session at a currently active menu.

3. The method of claim 2, further comprising:
  storing data to restore said audio interactive voice response session at said currently active menu; and,
  instructing said communication device to display a second indicia that indicates that said audio interactive voice response session may be reactivated at said currently active menu.

4. The method of claim 1, further comprising:
  instructing said communication device to display an indicia that said first mode may be reactivated.

5. The method of claim 1, wherein said second mode transfers said personal communications device to a second interactive session.

6. The method of claim 5, wherein said second interactive session is a second interactive voice response session that provides audio menus to said communication device.

7. The method of claim 5, wherein said second interactive session is a second interactive session that provides text menus to said communication device.

8. The method of claim 3, wherein said second indicia indicates information about said audio interactive voice response session.

9. The method of claim 3, wherein said second indicia indicates information about said currently active menu.

10. The method of claim 1, further comprising:
  instructing said communication device to display a second indicia that indicates that a currently displayed text menu may be refreshed.

11. The method of claim 1, wherein said second mode is a previously active menu.

12. A communication device, comprising:
  an audio interface adapted to establish an audio interactive voice response (IVR) session with an IVR system to provide audio menus to said communication device, wherein each of the audio menus have at least one tag identifier associated therewith;
  a data interface adapted to establish a data session with said IVR system;
  wherein said communication device displays an indicia that a second mode may be activated;
  and wherein, responsive to a user selection of said indicia, said communication device sends a first message to said IVR system; and,
  wherein, responsive to a second message from said IVR system, said communication device displays a second mode to provide text menus corresponding to the audio menus, wherein ones of the text menus are associated with ones of the audio menus using the tag identifiers.

13. The communication device 12, wherein said second mode suspends said audio interactive voice response session at a currently active menu.

14. The communication device of claim 12, wherein said communication device stores data to restore said audio interactive voice response session at said currently active menu; and,
  wherein said communication device displays a second indicia that indicates that said audio interactive voice response session may be reactivated at said currently active menu.

15. The communication device of claim 12, wherein said communication device displays indicia that said first mode may be reactivated.

16. The communication device of claim 12, wherein said second mode establishes a second interactive session.

17. The communication device of claim 16, wherein said second interactive session is a second interactive voice response session that provides audio menus to said communication device.

18. The communication device of claim 16, wherein said second interactive session is a second interactive session that provides text menus to said communication device.

19. The communication device of claim 14, wherein said second indicia indicates information about said audio interactive voice response session.

20. The communication device of claim 14, wherein said second indicia indicates information about said currently active menu.

21. The communication device of claim 12, wherein said communication device displays a second indicia that indicates that a currently displayed text menu may be refreshed.

22. The communication device of claim 12, wherein said second mode is a previously active menu.

23. A program storage device readable by a machine, tangibly embodying a program of instructions executable by the machine to perform method steps to operate a menu system, the method comprising:
  establishing an audio interactive voice response session to provide audio menus to a personal communication device, wherein each of the audio menus have at least one tag identifier associated therewith;
  establishing a data session with said personal communication device;
  sending a message via said data session to said personal communication device that instructs said personal communication device to display an indicia that a second mode may be activated;
  receiving a message from said personal communication device that is responsive to a user selection that indicates that said second mode is to be activated;
  activating said second mode to provide text menus corresponding to the audio menus, wherein ones of the text menus are associated with ones of the audio menus using the tag identifiers.

24. The program storage device of claim 23, wherein said second mode suspends said audio interactive voice response session at a currently active menu.

25. The program storage device of claim 24, the method further comprising:
  storing data to restore said audio interactive voice response session at said currently active menu; and,
  instructing said personal communication device to display a second indicia that indicates that said audio interactive voice response session may be reactivated at said currently active menu.

26. The program storage device of claim 23, the method further comprising:
  instructing said personal communication device to display an indicia that said first mode may be reactivated.

27. The program storage device of claim 23, wherein said second mode transfers said personal communications device to a second interactive session.

* * * * *